(12) United States Patent
Kojima et al.

(10) Patent No.: US 7,950,808 B2
(45) Date of Patent: May 31, 2011

(54) PROJECT DISPLAY APPARATUS HAVING DIFFUSION ELEMENT FOR REDUCING SPECKLE

(75) Inventors: Kuniko Kojima, Tokyo (JP); Hayato Takeuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 749 days.

(21) Appl. No.: 11/984,507

(22) Filed: Nov. 19, 2007

(65) Prior Publication Data
US 2008/0252863 A1 Oct. 16, 2008

(30) Foreign Application Priority Data

Apr. 16, 2007 (JP) .................................. 2007-107156

(51) Int. Cl.
*G03B 21/26* (2006.01)
*G03B 21/28* (2006.01)

(52) U.S. Cl. .......................................... 353/94; 353/37

(58) Field of Classification Search .................... 353/37, 353/50, 94
See application file for complete search history.

(56) References Cited

U.S. PATENT DOCUMENTS

| | | | |
|---|---|---|---|
| 6,594,090 B2* | 7/2003 | Kruschwitz et al. | 359/707 |
| 7,088,321 B1* | 8/2006 | Parker | 345/83 |
| 2008/0023553 A1* | 1/2008 | Jones | 235/462.41 |
| 2008/0079904 A1* | 4/2008 | Bartlett | 353/31 |

FOREIGN PATENT DOCUMENTS

| | | |
|---|---|---|
| JP | 63-124021 A | 5/1988 |
| JP | 4-331940 A | 11/1992 |
| JP | 6-208089 A | 7/1994 |
| JP | HEI07-005419 | 1/1995 |
| JP | HEI08-005979 | 1/1996 |
| JP | 2003-248270 | 9/2003 |
| JP | 2004-138669 A | 5/2004 |
| JP | 2004-144936 A | 5/2004 |
| JP | 2004-151177 | 5/2004 |
| JP | 2006-301114 A | 11/2006 |
| JP | 2007-33577 A | 2/2007 |
| JP | 2007-072172 | 3/2007 |
| JP | 2007-226012 | 9/2007 |

* cited by examiner

Primary Examiner — Thanh X Luu
(74) Attorney, Agent, or Firm — Birch, Stewart, Kolasch & Birch, LLP.

(57) ABSTRACT

An illuminating optical system propagates a coherent light flux from at least one light source into a predetermined optical path to guide the light flux to a screen. A light bulb forms an image to be displayed on the screen on an illumination area illuminated with the light flux that is guided by the illuminating optical system. A projecting optical unit projects the image that is formed on the illumination area onto the screen in a magnifying manner. The illuminating optical system includes a diffusing unit that diffuses the light flux from the light source near a focusing position of the illuminating optical system.

18 Claims, 5 Drawing Sheets

FIG.3

| ARRANGING POSITION OF DIFFUSING PLATE | TYPE OF DIFFUSING PLATE | BRIGHTNESS | SPECKLE |
|---|---|---|---|
| WITHOUT DIFFUSING PLATE | - | 100% | HIGH |
| INCIDENT SURFACE OF INTENSITY EQUALIZING ELEMENT | A | 85% | HIGH |
| | B | 84% | HIGH |
| | C | 59% | LOW |
| OUTPUT SURFACE OF INTENSITY EQUALIZING ELEMENT | A, B, C | IMAGE QUALITY GREATLY LOWERED DUE TO PARTICULE STRUCTURE OF DIFFUSING PLATE TRANSFERRED ONTO SCREEN | |
| FOCUSING POSITION OF ILLUMINATING OPTICAL SYSTEM | A | 90% | MEDIUM |
| | B | 87% | LOW |
| | C | 62% | LOW |

FIG.4

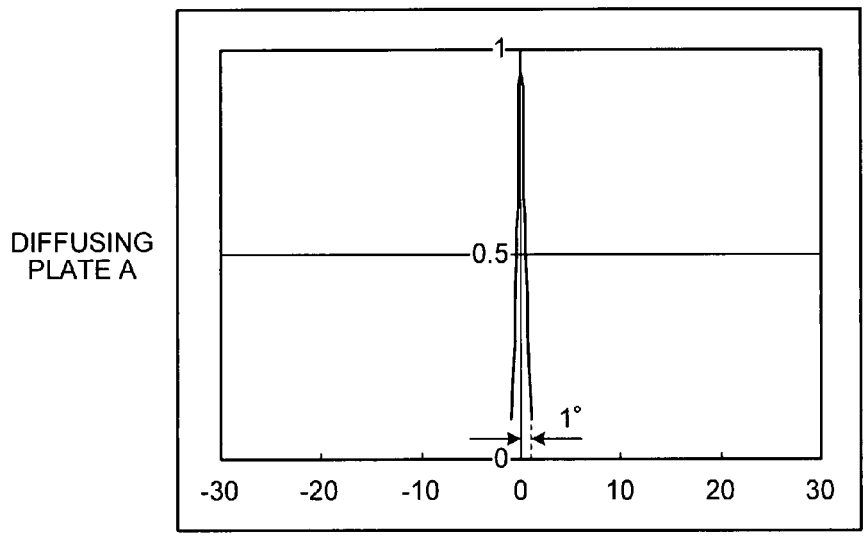

DIFFUSING PLATE A

PROJECT DISPLAY APPARATUS HAVING DIFFUSION ELEMENT FOR REDUCING SPECKLE

BACKGROUND OF THE INVENTION

1. Field of the Invention

The present invention relates to a projection display apparatus.

2. Description of the Related Art

A conventional projection display apparatus employs a lamp light source such as an extra-high pressure mercury lamp and a metal halide lamp. However, such a lamp light source has a relatively short life and requires frequent replacement. In addition, in a projection display apparatus employing the above lamp light source, an optical system for filtering a red light, a green light, and a blue light from a white light is necessary, which complicates a structure of the apparatus and decreases light use efficiency.

To cope with such inconveniences, a projection display apparatus that employs a laser light source, such as a semiconductor laser, has been developed. Because the life of the laser light source is much longer than that of a lamp light source, maintenance is less required for the laser light source. Furthermore, because a laser light of the laser light source can be directly modulated, the light use efficiency increases and the structure of the apparatus can be simple. In addition, employing the laser light source can lead to a reproduction of colors in a wider.

However, a high coherence of the laser light source causes a speckle, a speckle noise, and a speckle pattern, i.e., a high-contrast spot pattern formed on a screen, which degrades the quality of an image displayed on the screen. For this reason, it is of importance to reduce the speckle and the like in a projection display apparatus employing a laser light source. For example, Japanese Patent Application Laid-open No. H6-208089 discloses a method of rotating a diffusing element, i.e., a diffusing plate, in an optical system to reduce a speckle and the like.

As such a diffusing plate, a frosted glass is widely used. Japanese Patent Application Laid-Open No. H6-208080, however, does not specify where the diffusing plate should be positioned or in which way the diffusing plate should rotate, which does not lead to effective reduction of the speckle. In addition, a mechanism for rotating the diffusing plate is necessary in the above method, which increases the size of the apparatus, the number of components, and the cost, possibly generating a noise.

SUMMARY OF THE INVENTION

It is an object of the present invention to at least partially solve the problems in the conventional technology.

A projection display apparatus according to one aspect of the present invention performs an image display by projecting an image onto a screen. The projection display apparatus includes at least one light source that emits a coherent light flux; an illuminating optical system that propagates the light flux from the light source into a predetermined optical path to guide the light flux to the screen; a light bulb that forms an image to be displayed on the screen on an illumination area illuminated with the light flux that is guided by the illuminating optical system; and a projecting optical unit that projects the image that is formed on the illumination area onto the screen in a magnifying manner. The illuminating optical system includes a diffusing unit that diffuses the light flux from the light source near a focusing position of the illuminating optical system.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a table of results of examinations on diffusing plates that function as a diffusing element shown in FIG. 1;

FIGS. 4 to 6 are schematic diagrams for explaining diffusing characteristics of the diffusing plates;

DETAILED DESCRIPTION OF THE PREFERRED EMBODIMENTS

Exemplary embodiments of the present invention are explained in detail below with reference to the accompanying drawings.

Figure 1:
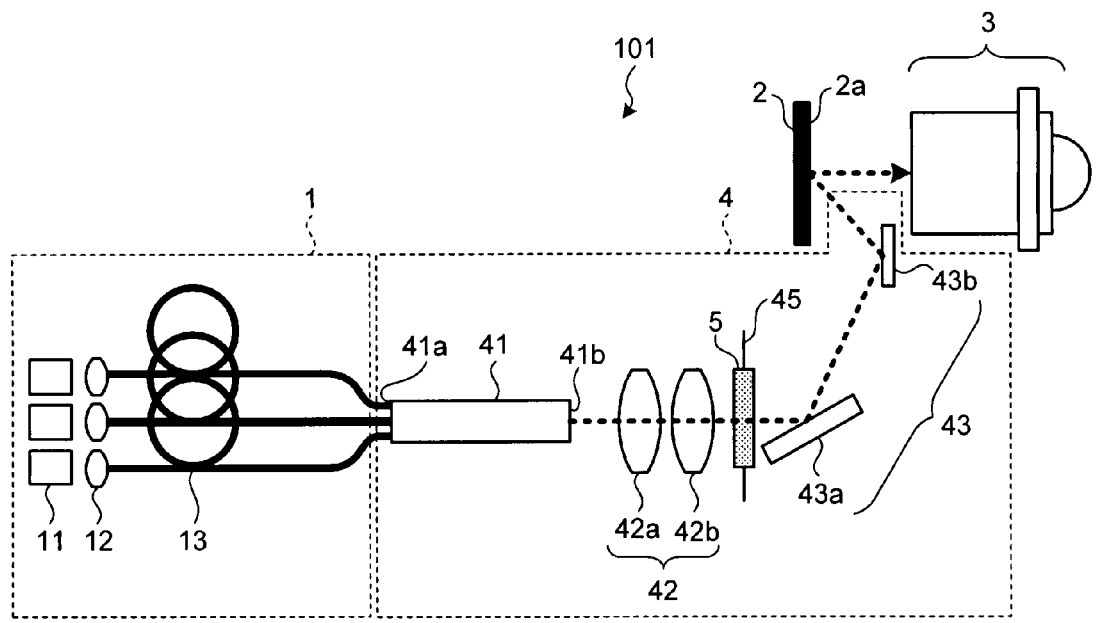
FIG. 1 is a schematic diagram of a projection display apparatus according to a first embodiment of the present invention.

FIG. 1 is a schematic diagram of a projection display apparatus 101 according to a first embodiment of the present invention. The projection display apparatus 101 projects an image onto a screen with a light bulb.

The projection display apparatus 101 includes a coupling optical system 1, an illuminating optical system 4, a reflection-type light-modulating element 2, and a projection optical system 3. The reflection-type light-modulating element 2 is a reflection light bulb. The illuminating optical system 4 illuminates a surface (area on which an image is formed) 2a of the reflection-type light-modulating element 2 to form an image, and the projection optical system 3 projects the image on the surface 2a onto a screen (not shown).

The coupling optical system 1 includes three laser light sources 11, each emitting a light flux (i.e., the laser light sources 11 correspond respectively to three colors), three focusing units 12, each focusing the light flux emitted by the corresponding laser light source 11, and three optical fibers 13, each guiding the light flux output from the corresponding focusing unit 12 to the illuminating optical system 4.

The coupling optical system 1 includes an intensity equalizing element 41, a relay lens group 42 that includes a lens 42a and a lens 42b, a diffusing element 5, and a mirror group 43 that includes a first mirror 43a and a second mirror 43b. The intensity equalizing element 41 equalizes an intensity distribution of the light flux output from the coupling optical system 1 (from the optical fiber 13), i.e., reduces difference in illumination intensities. The relay lens group 42 and the mirror group 43 guide the light flux, which is output from the intensity equalizing element 41, to the reflection-type light-modulating element 2.

The intensity equalizing element 41 has an incident surface (incident wavefront) 41a on which the light flux is incident and an output surface (output wavefront) 41b from which the light flux is output. The incident surface 41a is opposed to the optical fibers 13, and the output surface is opposed to the relay lens group 42.

The intensity equalizing element 41 is made of a transparent material such as glass or resin. The intensity equalizing element 41 includes a cylindrical rod having a polygonal cross section. An inner surface of the intensity equalizing element 41 serves as a total-reflection surface. Alternatively, the intensity equalizing element 41 includes a tubular member such as a pipe that has a polygonal cross section and a reflecting inner wall that reflects the light flux.

In the above cylindrical rod, the light flux is reflected for multiple times because of a reflection effect led by the transparent material and the air interface, and is output from the output surface 41b. In the above pipe, the light flux is reflected for multiple times because of a reflection effect led by the reflecting inner wall, and is output from the output surface 41b.

Because the intensity equalizing element 41 has an appropriate length in a direction in which the light flux travels, the light flux is superimposed near the output surface 41b after being reflected for multiple times, which results in an approximately uniform intensity distribution. The light flux output from the output surface 41b having the uniform intensity distribution is guided to the reflection-type light-modulating element 2 by the relay lens group 42 and the mirror group 43, and accordingly, the surface 2a is illuminated with the light fluxes.

The light flux propagating via the relay lens group 42 is diffused by the diffusing element 5, and then is output to the mirror group 43. In this manner, the speckle is reduced. The diffusing element 5 is a holographic diffusing element that includes a hologram pattern formed on a substrate. Depending on the hologram pattern, the light flux can be diffused at an arbitrarily angle. According to the first embodiment, by positioning the diffusing element 5 at a focusing position 45 of the illuminating optical system 4, which is explained below, the speckle can be efficiently reduced.

The reflection-type light-modulating element 2 is, for example, a digital micro-mirror device (MDD) (registered trademark) that includes a large number of movable micromirrors (for example, several hundred thousands of micromirrors) corresponding respectively to pixels. The micromirrors are two-dimensionally arranged on a substrate, and are configured to tilt depending on pixel information.

By tilting a micromirror with respect to the plane on which the micromirrors are arranged (the surface of the substrate) by a degree α (for example, 12 degrees) in a specific direction, the incident light flux is reflected on the micromirror and is directed to the projection optical system 3. The light flux incident on the projection optical system 3 is used to project the image onto the screen.

By tilting a micromirror with respect to the plane by a degree β (for example −12 degrees) in a specific direction, the incident light flux is reflected on the micromirror and is directed to a light absorbing plate (not shown). The light flux incident on the light absorbing plate is not used to project the image onto the screen.

Figure 2:
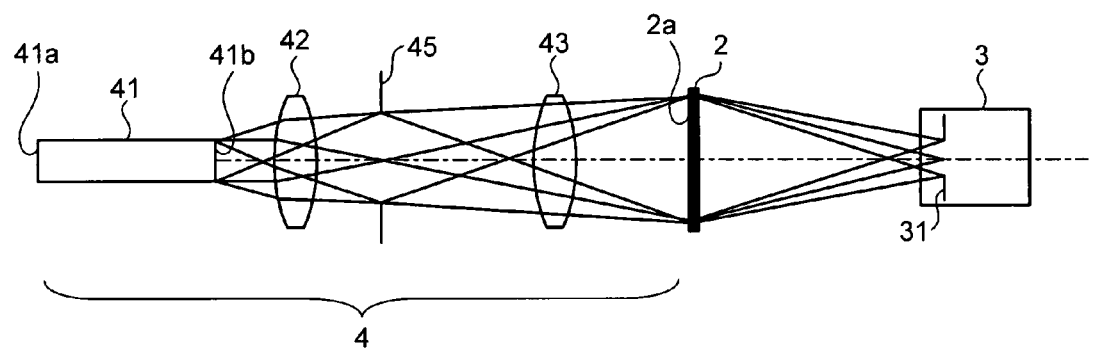
FIG. 2 is a schematic diagram for explaining a concept of light propagation in an illuminating optical system shown in FIG. 1.

The light propagation in an optical path in the illuminating optical system 4 is explained below. FIG. 2 is a schematic diagram of a concept of light propagation of the illuminating optical system 4 shown in FIG. 1. In the example shown in FIG. 2, each of the relay lens group 42 and the mirror group 43 is represented as a single lens element.

The output surface 41b of the intensity equalizing element 41 is optically conjugate with the surface 2a of the reflection-type light-modulating element 2. In addition, incident apertures 31 of the projection optical system 3 are optically conjugate with the focusing position 45. At the focusing position 45, a key light output from the intensity equalizing element 41 is approximately focused. The focusing position 45 is conjugate not only with the incident apertures 31 but also with the incident surface 41a of the intensity equalizing element 41. Thus, even if a light flux is partly cut at the focusing position 45, an image loss can be inhibited from being caused on a display image displayed on the screen.

As shown in FIG. 1, the focusing position 45 is present approximately in the middle between the relay lens group 42 and the mirror group 43 (near the diffusing element 5).

A method of varying a speckle pattern, which is caused with a light source such as a laser light source emitting a coherent light, is explained below. In this method, the speckle is reduced because of the diffusing effects led by the diffusing element 5.

According to the first embodiment, the diffusing element 5 is arranged in an appropriate position to efficiently reduce the speckle. It is not appropriate to arrange the diffusing element 5 in the projection optical system 3, because the projection optical system 3 is an imaging optical system and such arrangement further blurs the image. Thus, the diffusing element 5 is arranged in the illuminating optical system 4.

FIG. 3 is a table of results of examinations on images each displayed on a screen with one of diffusing plates A, B, and C that function as the diffusing element 5 and that are arranged in various positions. Each of the diffusing plates A to C is positioned at the incident surface 41a, at the output surface 41b, or at the focusing position 45. In each case, the image displayed on the screen is examined with respect to the brightness of the screen (hereinafter, "screen brightness") and an intensity of the speckle.

The brightness shown in FIG. 3 is examined based on a reference brightness, i.e., the brightness of 100% obtained when an image is displayed without the diffusing element 5 and the intensity of the speckle obtained with the brightness of 100%. The word "high speckle" shown in FIG. 3 represents that a speckle having a high intensity is caused, "low speckle" represents that a speckle having a low intensity is caused (i.e., speckle is efficiently reduced), and "medium speckle" represents that a speckle having an intensity between the high intensity and the low intensity.

Figure 5:
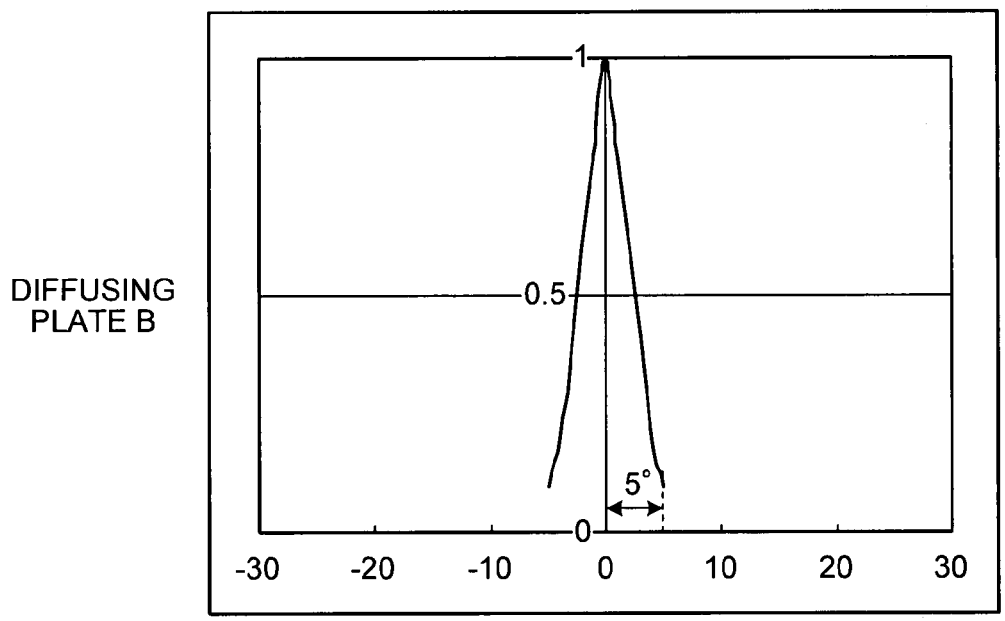
Figure 6:
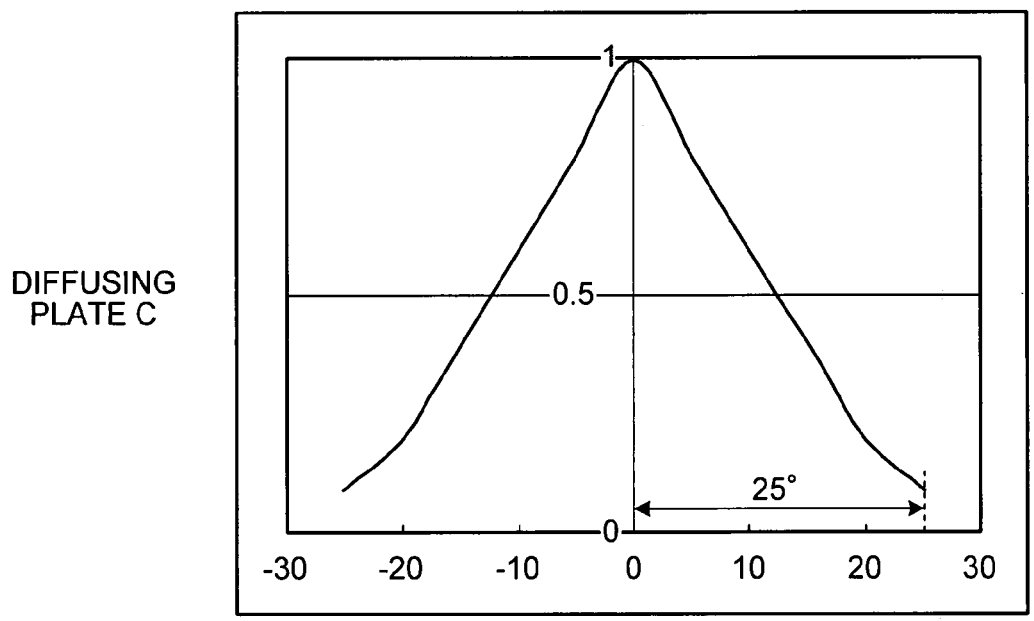

In each of the diffusing plates A to C, a light flux is diffused at each specific angle. FIGS. 4 to 6 are schematic diagrams for explaining diffusing characteristics of the diffusing plates A to C. As shown in FIG. 4, a collimated light flux incident on the diffusing plate A is diffused by ±1 degree. As shown in FIG. 5, a collimated light flux incident on the diffusing plate B is diffused by ±5 degrees. As shown in FIG. 6, a collimated light flux incident on the diffusing plate C is diffused by ±25 degrees.

When the diffusing plate A is arranged at the incident surface 41a, the screen brightness is 85% of the reference brightness and the effect of reducing the speckle (hereinafter, "speckle-reduction effect") is very small. When the diffusing plate B is arranged at the incident surface 41a, the screen brightness is 84% of the reference brightness and the speckle-reduction effect is very small. When the diffusing plate C is arranged at the incident surface 41a, the speckle-reduction effect is large and a preferable image quality can be obtained.

However, because the light flux is largely diffused, the screen brightness is low, i.e., the screen brightness is 59% of the reference brightness.

When each of the diffusing plate A to C is arranged at the output surface 41b, the image quality degrades because the output surface 41b is optically conjugate with the surface 2a and the particle structure of each of the diffusing plates A to C is transferred onto the screen. Therefore, according to the first embodiment, the diffusing element 5 is not arranged at the output surface 41b.

When the diffusing plate A is arranged at the focusing position 45, the screen brightness is 90% of the reference brightness. In this case, the speckle is reduced; however, the speckle is still visible so that preferable image display cannot be realized.

When the diffusing plate B is arranged at the focusing position 45, the screen brightness is 87% of the reference brightness. In this case, the speckle-reduction effect is large and a preferable image quality can be obtained. Also when the diffusing plate C is arranged at the focusing position 45, the speckle-reduction effect is large and a preferable image quality can be obtained. However, in this case, the screen brightness significantly lowers, i.e., the brightness is 62% of the reference brightness.

When the diffusing element 5 is arranged at the surface 2a, the particle structure of the diffusing element 5 is transferred onto the screen, which degrades the quality of the displayed image. On the other hand, according to the first embodiment, the image quality does not largely degrade because the diffusing element 5 is arranged near the focusing position 45.

Because no antireflection coating is applied to the surfaces of the diffusing plates A to C, a loss of the brightness of approximately 10% is caused because the surfaces of the diffusing plates A to C reflect the light flux. In other words, the arrangement of any the diffusing plates A to C hardly causes a loss of brightness with respect to geometric optics except for the loss caused by the reflection of the light flux on the surface of the diffusing plates A to C. Therefore, by applying the antireflection coating to the surface of the diffusing element 5, it is possible to reduce the loss, which is caused by the reflection on the surface of the diffusing element 5, to a several %. If the diffusing element 5 is rotated or vibrated, the speckle-reduction effect is enhanced.

According to the first embodiment, the holographic diffusing element is used as the diffusing element 5. Alternatively, as the diffusing element 5, a frosted glass or a scattering member that scatters an image light, and that has a surface on which particles are coated, can be used, which leads to similar effects to those obtained using the holographic diffusing element.

According to the first embodiment, the relay lens group 42 includes the lenses 42a and 42b. Alternatively, a single lens can be used as the relay lens group 42 or the relay lens group 42 can include three lenses or more. According to the first embodiment, the mirror group 43 includes the first mirror 43a and the second mirror 43b. Alternatively, a single mirror can be used as the mirror group 43 or the mirror group 43 can include three mirrors or more.

According to the first embodiment, as the intensity equalizing element 41, the cylindrical rod, or the tubular member, that has a polygonal cross section is used. Alternatively, a lens array including a plurality of lens elements that are two-dimensionally arranged can be used for the intensity equalizing element 41.

According to the first embodiment, the DMD (registered trademark) is used as the reflection-type light-modulating element 2 (light bulb). Alternatively, a transmissive liquid crystal display (LCD) element, a reflective LCD element, or a liquid crystal panel can be used as the reflection-type light-modulating element 2.

According to the first embodiment, because the diffusing element 5 is arranged at the focusing position 45 in the optical system that includes the light source emitting a coherent light flux, the speckle can be efficiently reduced with a simple configuration so that a high-quality image can be displayed on the screen.

It suffices that the diffusing element 5 arranged at the focusing position 45 has a relatively small area and relatively low dispersing performance to reduce the speckle. Therefore, the optical system can be down-sized easily and a high-quality image can be displayed efficiently at low cost.

Because the diffusing element 5 is configured with the holographic diffusing element, the speckle can be efficiently reduced. Moreover, because a scattering member that scatters an image light is used as the diffusing element 5, the speckle can be reduced with a simple structure at low cost. Moreover, because an antireflection coating is applied to the surface of the diffusing element 5, a loss due to reflection of a light flux on the surface of the diffusing element 5 can be reduced, which makes it possible to display an image efficiently.

Because the projection display apparatus 101 includes the laser light sources 11, the optical system having a long life can be realized and bright colors and high color-reproduction performance can be realized. Moreover, because the light fluxes emitted by the laser light sources 11 are guided via the optical fibers 13, the arrangement of the optical system can be flexible and the light fluxes can be efficiently used. Moreover, because the light fluxes are multiply-reflected in the optical fibers 13, the speckle can be efficiently reduced so that a uniform image quality can be obtained.

Because a tubular member can be used for the intensity equalizing element 41 and the light flux is reflected on the reflecting inner surface of the tubular member, the intensity equalizing element 41 is not heated easily, and thus, the intensity equalizing element 41 can be cooled down and can be easily held. Moreover, because the intensity equalizing element 41 is a rod member made of transparent material, the intensity equalizing element 41 can be designed easily.

Because a lens array including the lens elements that are two-dimensionally arranged is used for the intensity equalizing element 41, the light intensity distribution can be uniform, which inhibits illumination variations.

Figure 7:
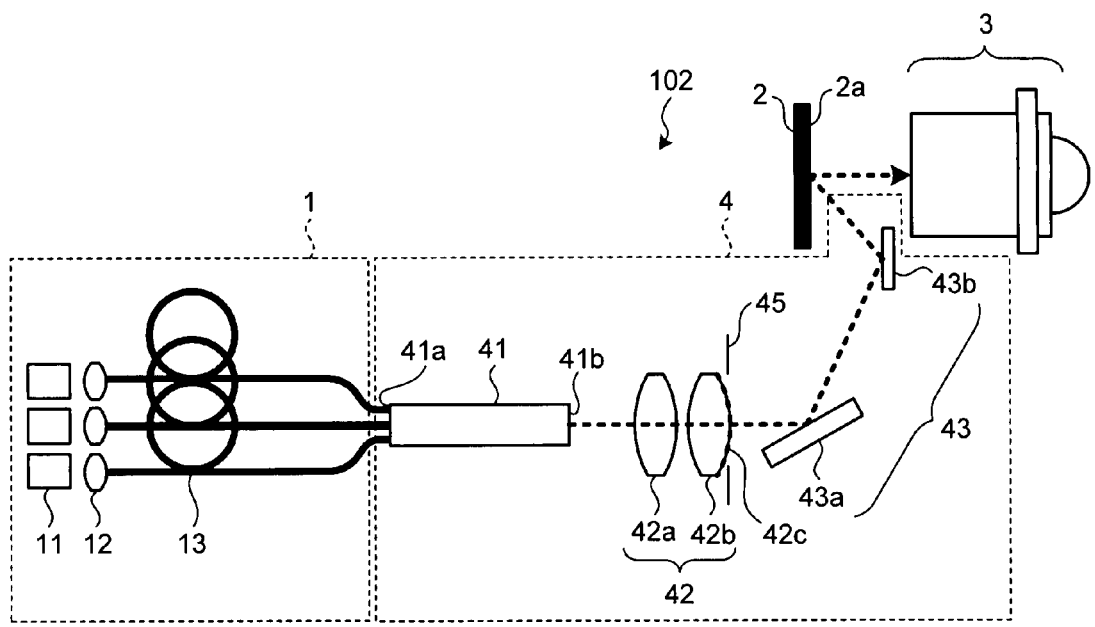
FIG. 7 is a schematic diagram of a projection display apparatus according to a second embodiment of the present invention.

FIG. 7 is a schematic diagram of a projection display apparatus 102 according to a second embodiment of the present invention. The structural components of the projection display apparatus 102 are given the reference numerals given to those of the projection display apparatus 101 of the first embodiment shown in FIG. 1, which have same functions as the structural components of the projection display apparatus 102. Thus, the same explanations are omitted below.

In the projection display apparatus 102, the focusing position 45 of the illuminating optical system 4 is near the relay lens group 42, and the relay lens group 42 functions as the diffusing element 5, i.e., the relay lens group 42 includes a diffusing unit.

In the illuminating optical system 4 of the projection display apparatus 102, the focusing position 45 is near the relay lens group 42. Specifically, as shown in FIG. 7, the focusing position 45 is near the output surface 42c of the lens 42b.

At least one of the surfaces of the lenses 42a and 42b is a rough surface. Specifically, the output surface 42c is a rough surface. Because the focusing position 45 is near the output surface 42c and the output surface 42c is a rough surface, the effects (display image) obtained with the diffusing element 5 according to the first embodiment can be obtained. Alternatively, to obtain such effects, a light-diffusing film that diffuses a light flux can be attached to the output surface 42c, or at least one of the lenses 42a and 42b can be made of a light-diffusing material that diffuses a light flux. In both cases, the effects to be led by the diffusing element 5 can be obtained, and thus, it is unnecessary to arrange the diffusing element 5.

Figure 8:
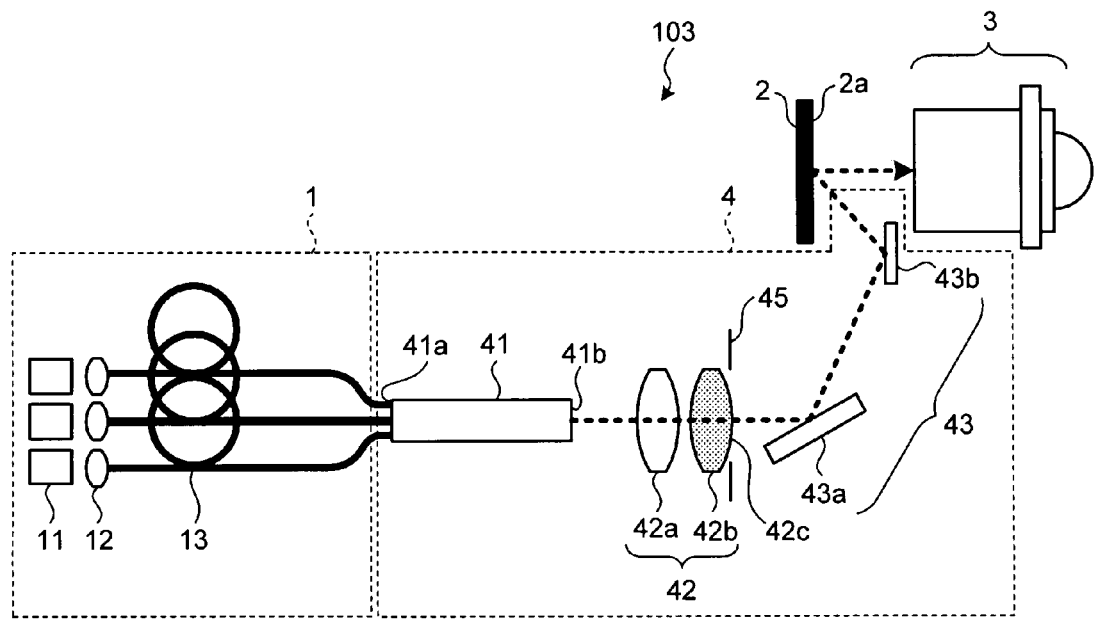
FIG. 8 is a schematic diagram of an example of the projection display apparatus shown in FIG. 7.

The lens 42b can be made of a plastic material containing frosted glass or a light-diffusing material. This case is represented in FIG. 8 that is a schematic diagram of a projection display apparatus 103 as an example of the projection display apparatus 102 according to the second embodiment. The structural components of the projection display apparatus 103 are given the reference numerals given to those of the projection display apparatus 101 or the projection display apparatus 102, which has same functions as the structural components of the projection display apparatus 103. Thus, the same explanations are omitted below.

Because the lens 42b of the projection display apparatus 103 is made of a plastic material containing frosted glass or a light-diffusing material, the same effects obtained with the diffusing element 5 can be obtained, i.e., the lens 42b functions as the diffusing element 5. Thus, it is unnecessary to arrange the diffusing element 5 as in the case of the projection display apparatus 102.

According to the second embodiment, it is unnecessary to arrange the diffusing element 5. Therefore, the loss of the light flux due to the reflection of the light flux on the surface of the diffusing element 5 is not caused, and the speckle can be efficiently reduced with a simple structure.

Figure 9:
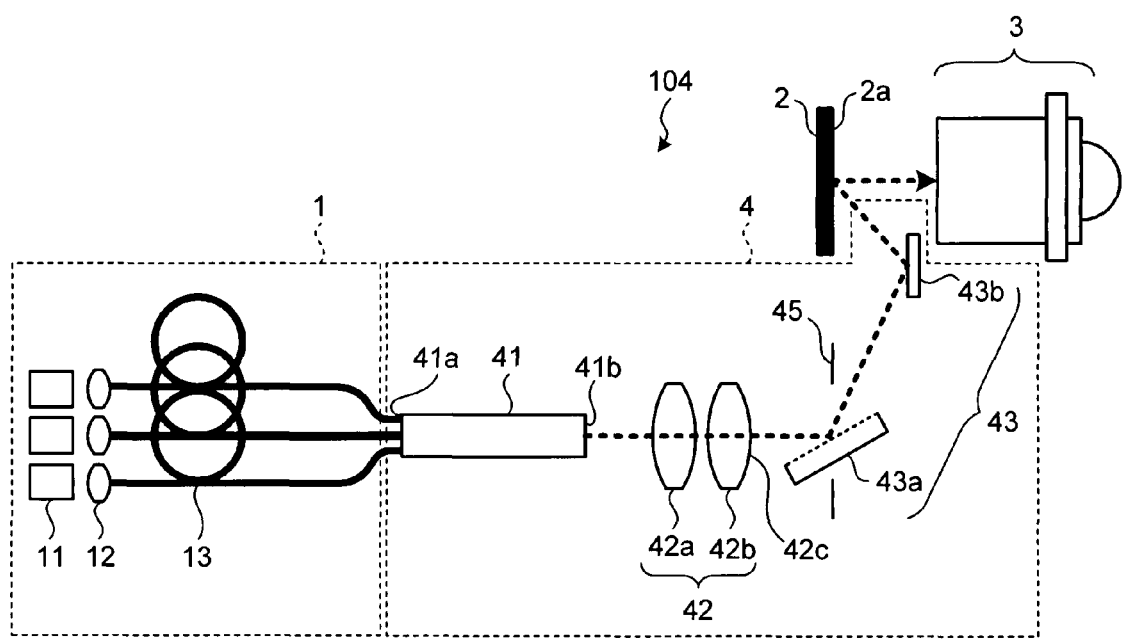
FIG. 9 is a schematic diagram of a projection display apparatus according to a third embodiment of the present invention.

FIG. 9 is a schematic diagram of a projection display apparatus 104 according to a third embodiment of the present invention. The structural components of the projection display apparatus 104 are given the reference numerals given to those of the projection display apparatus 101 of the first embodiment shown in FIG. 1, which have same functions as the structural components of the projection display apparatus 104. Thus, the same explanations are omitted below.

In the projection display apparatus 104, the focusing position 45 is near the mirror group 43 in the illuminating optical system 4, and the mirror group 43 functions as the diffusing element 5, i.e., the mirror group 43 includes a diffusing unit.

In the illuminating optical system 4 of the projection display apparatus 104, the focusing position 45 is near the mirror group 43. Specifically, as shown in FIG. 7, the focusing position 45 is near a reflecting surface 43c of the first mirror 43a.

At least one of the surfaces of the first mirror 43a and the second mirror 43b is a rough surface. Specifically, the reflecting surface 43c is a rough surface. Because the focusing position 45 is near the reflecting surface 43c and the reflecting surface 43c is a rough surface, the effects (display image) obtained with the diffusing element 5 according to the first embodiment can be obtained.

According to the third embodiment, it is unnecessary to arrange the diffusing element 5 because the reflecting surface 43c is a rough surface and functions as the diffusing element 5. Therefore, the loss of the light flux due to the reflection of the light flux on the surface of the diffusing element 5 is not caused, and the speckle can be efficiently reduced with a simple structure.

As described above, according to an aspect of the present invention, the speckle can be efficiently reduced with a simple structure, and thus, a high-quality image can be displayed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection display apparatus that performs an image display by projecting an image onto a screen, the projection display apparatus comprising:
    at least one light source that emits a coherent light flux;
    an illuminating optical system that propagates the light flux from the light source into a predetermined optical path to guide the light flux to the screen;
    a reflection-type light modulating unit that forms an image to be displayed on the screen on an illumination area illuminated with the light flux that is guided by the illuminating optical system; and
    a projecting optical unit that projects the image that is formed on the illumination area onto the screen in a magnifying manner, wherein
    the illuminating optical system includes a diffusing unit that diffuses the light flux from the light source, the diffusing unit being located at or near a position that is optically conjugate with an incident aperture of the projecting optical unit, a light-intensity equalizing element that equalizes an intensity distribution of the light flux from the light source, and a relay lens group that leads the light flux from the light-intensity equalizing element to the reflection-type light modulating unit,
    the position is near the relay lens group, and
    the relay lens group includes the diffusing unit.

2. The projection display apparatus according to claim 1, wherein the diffusing unit is a holographic diffusing element.

3. The projection display apparatus according to claim 1, wherein the diffusing unit is a light-scattering member.

4. The projection display apparatus according to claim 1, wherein the diffusing unit is a frosted glass.

5. The projection display apparatus according to claim 1, wherein the diffusing unit is formed by making at least one surface rough from among lens surfaces in the relay lens group.

6. The projection display apparatus according to claim 1, wherein the diffusing unit is formed by forming at least one lens with a material that diffuses a light flux from among lenses in the relay lens group.

7. The projection display apparatus according to claim 1, wherein the diffusing unit is formed by attaching a light diffusing film that diffuses a light flux on at least one surface from among lens surfaces in the relay lens group.

8. The projection display apparatus according to claim 1, wherein an antireflection coating is applied on the diffusing unit.

9. The projection display apparatus according to claim 1, wherein the light source is a laser light source.

10. The projection display apparatus according to claim 9, wherein the light flux from the light source is guided to the light-intensity equalizing element via an optical fiber.

11. A projection display apparatus that performs an image display by projecting an image onto a screen, the projection display apparatus comprising:
    , at least one light source that emits a coherent light flux;
    an illuminating optical system that propagates the light flux from the light source into a predetermined optical path to guide the light flux to the screen;
    a reflection-type light modulating unit that forms an image to be displayed on the screen on an illumination area illuminated with the light flux that is guided by the illuminating optical system; and a projecting optical unit that projects the image that is formed on the illumination area onto the screen in a magnifying manner, wherein the illuminating optical system includes a diffusing unit that diffuses the light flux from the light source, the diffusing unit being located at or near a position that is optically conjugate with an incident aperture of the projecting optical unit, a light-intensity equalizing element that equalizes an intensity distribution of the light flux from the light source, and a mirror group that leads the light flux from the light-intensity equalizing element to the reflection-type light modulating unit, the position is near the mirror group, and the mirror group includes the diffusing unit.

12. The projection display apparatus according to claim 11, wherein the diffusing unit is formed by making at least one surface rough from among mirror surfaces in the mirror group.

13. The projection display apparatus according to claim 11, wherein the diffusing unit is a holographic diffusing element.

14. The projection display apparatus according to claim 11, wherein the diffusing unit is a light-scattering member.

15. The projection display apparatus according to claim 11, wherein the diffusing unit is a frosted glass.

16. The projection display apparatus according to claim 11, wherein an antireflection coating is applied on the diffusing unit.

17. The projection display apparatus according to claim 11, wherein the light source is a laser light source.

18. The projection display apparatus according to claim 17, wherein the light flux from the light source is guided to the light-intensity equalizing element via an optical fiber.

* * * * *